US012676376B2

(12) United States Patent
Boddakayala et al.

(10) Patent No.: US 12,676,376 B2
(45) Date of Patent: Jul. 7, 2026

(54) TRACTION BATTERY PACK ENCLOSURE ASSEMBLIES WITH INTEGRATED THERMAL BARRIER SYSTEMS

(71) Applicant: FORD GLOBAL TECHNOLOGIES, LLC, Dearborn, MI (US)

(72) Inventors: Bhaskara Rao Boddakayala, Troy, MI (US); Sudhakar Nandam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 762 days.

(21) Appl. No.: 17/514,339

(22) Filed: Oct. 29, 2021

(65) Prior Publication Data

US 2023/0137044 A1    May 4, 2023

(51) Int. Cl.
| | |
|---|---|
| *H01M 50/233* | (2021.01) |
| *H01M 50/204* | (2021.01) |
| *H01M 50/249* | (2021.01) |
| *H01M 50/271* | (2021.01) |
| *H01M 50/502* | (2021.01) |

(52) U.S. Cl.
CPC ....... *H01M 50/233* (2021.01); *H01M 50/204* (2021.01); *H01M 50/249* (2021.01); *H01M 50/271* (2021.01); *H01M 50/502* (2021.01); *H01M 2220/20* (2013.01)

(58) Field of Classification Search
CPC ............. H01M 50/233; H01M 50/204; H01M 50/249; H01M 50/271; H01M 50/502; H01M 2220/20
See application file for complete search history.

(56) References Cited

U.S. PATENT DOCUMENTS

| | | | |
|---|---|---|---|
| 11,084,386 B2 | 8/2021 | Howard et al. | |
| 2003/0047366 A1* | 3/2003 | Andrew et al. ....... | H01M 10/63 180/68.5 |
| 2018/0166757 A1* | 6/2018 | Smoot et al. ....... | H01M 50/505 |
| 2018/0248237 A1 | 8/2018 | Postler et al. | |
| 2018/0323413 A1 | 11/2018 | Nicholls | |
| 2020/0335737 A1* | 10/2020 | Hilligoss et al. . | H01M 50/1245 |
| 2021/0111388 A1 | 4/2021 | Stephens et al. | |
| 2021/0175569 A1 | 6/2021 | Ng et al. | |
| 2021/0249709 A1 | 8/2021 | Schriever et al. | |

FOREIGN PATENT DOCUMENTS

| | | |
|---|---|---|
| WO | 2020/128160 A1 | 6/2020 |
| WO | 2020/136160 A1 | 7/2020 |
| WO | 2021/075743 A1 | 4/2021 |

* cited by examiner

*Primary Examiner* — Matthew T Martin
*Assistant Examiner* — Alexandra J Simmons
(74) *Attorney, Agent, or Firm* — David B. Kelley; Carlson, Gaskey & Olds, P.C.

(57) ABSTRACT

Traction battery pack designs for use in electrified vehicles may include a thermal barrier system adapted for mitigating thermal propagation inside of the traction battery pack during battery thermal events. The thermal barrier system may include features such as a bifurcation structure and/or a canopy structure. The bifurcation structure is adapted for substantially isolating a first portion of an enclosure interior where a first battery internal component (e.g., a first battery array) resides from a second portion of the enclosure interior where a second battery internal component (e.g., a second battery array) resides, and the canopy structure is adapted for protecting a bus bar assembly of the traction battery pack.

11 Claims, 3 Drawing Sheets

TRACTION BATTERY PACK ENCLOSURE ASSEMBLIES WITH INTEGRATED THERMAL BARRIER SYSTEMS

TECHNICAL FIELD

This disclosure relates generally to electrified vehicle traction battery packs, and more particularly to traction battery pack enclosure assemblies that include integrated thermal barrier systems for mitigating the effects of battery thermal events.

BACKGROUND

Electrified vehicles are designed to reduce or completely eliminate reliance on internal combustion engines. In general, electrified vehicles differ from conventional motor vehicles because they are selectively driven by battery powered electric machines. Conventional motor vehicles, by contrast, rely exclusively on the internal combustion engine to propel the vehicle.

A high voltage traction battery pack typically powers the electric machines and other electrical loads of the electrified vehicle. The traction battery pack includes a plurality of battery cells and various other battery internal components that support the electric propulsion of electrified vehicles.

SUMMARY

A battery pack according to an exemplary aspect of the present disclosure includes, among other things, an enclosure assembly, a first battery array housed within the enclosure assembly, and a second battery array housed within the enclosure assembly. The enclosure assembly includes a thermal barrier system adapted to minimize thermal propagation within an interior of the enclosure assembly during a battery thermal event. The thermal barrier system includes a bifurcation structure that extends between the first battery array and the second battery array.

In a further non-limiting embodiment of the foregoing battery pack, the enclosure assembly includes a tray and a cover. The thermal battery system protrudes from an inner surface of the cover.

In a further non-limiting embodiment of either of the foregoing battery packs, the bifurcation structure isolates a first portion of the interior where the first battery array resides from a second portion of the interior where the second battery array resides.

In a further non-limiting embodiment of any of the foregoing battery packs, the bifurcation structure includes an outer foam layer that is received in abutting contact with a mounting structure that extends between the first battery array and the second battery array.

In a further non-limiting embodiment of any of the foregoing battery packs, the outer foam layer is received in abutting contact with an upper platform of the mounting structure.

In a further non-limiting embodiment of any of the foregoing battery packs, the bifurcation structure straddles a mounting structure that extends between the first battery array and the second battery array.

In a further non-limiting embodiment of any of the foregoing battery packs, the thermal barrier system includes a canopy structure arranged to cover at least a portion of a bus bar assembly that electrically couples the first and second battery arrays.

In a further non-limiting embodiment of any of the foregoing battery packs, the canopy structure includes a first arm that is arranged to cover a first portion of the bus bar assembly and a second arm that is arranged to cover a second portion of the bus bar assembly.

In a further non-limiting embodiment of any of the foregoing battery packs, the first arm includes a first angled tip portion that is angled toward the first battery array and a second angled tip portion that is angled toward the second battery array.

In a further non-limiting embodiment of any of the foregoing battery packs, the first angled tip portion includes a first outer foam layer that is received in abutting contact with an upper surface of the first battery array, and the second angled tip portion includes a second outer foam layer that is received in abutting contact with an upper surface of the second battery array.

A battery pack according to another exemplary aspect of the present disclosure includes, among other things, an enclosure assembly, a first battery array housed within the enclosure assembly, a second battery array housed within the enclosure assembly, and a bus bar assembly configured to electrically couple the first and second battery arrays. The enclosure assembly includes a thermal barrier system adapted to minimize thermal propagation within an interior of the enclosure assembly during a battery thermal event. The thermal barrier system includes a canopy structure arranged to cover at least a portion of the bus bar assembly.

In a further non-limiting embodiment of the foregoing battery pack, the enclosure assembly includes a tray and a cover. The thermal battery system protrudes from an inner surface of the cover.

In a further non-limiting embodiment of either of the foregoing battery packs, the canopy structure includes a first arm that is arranged to cover a first portion of the bus bar assembly and a second arm that is arranged to cover a second portion of the bus bar assembly.

In a further non-limiting embodiment of any of the foregoing battery packs, the first arm includes a first angled tip portion that is angled toward the first battery array and a second angled tip portion that is angled toward the second battery array.

In a further non-limiting embodiment of any of the foregoing battery packs, the first angled tip portion includes a first outer foam layer that is received in abutting contact with an upper surface of the first battery array, and the second angled tip portion includes a second outer foam layer that is received in abutting contact with an upper surface of the second battery array.

In a further non-limiting embodiment of any of the foregoing battery packs, the thermal barrier system includes a bifurcation structure that extends between the first battery array and the second battery array.

In a further non-limiting embodiment of any of the foregoing battery packs, the bifurcation structure isolates a first portion of the interior where the first battery array resides from a second portion of the interior where the second battery array resides.

In a further non-limiting embodiment of any of the foregoing battery packs, the bifurcation structure includes an outer foam layer that is received in abutting contact with a mounting structure that extends between the first battery array and the second battery array.

In a further non-limiting embodiment of any of the foregoing battery packs, the outer foam layer is received in abutting contact with an upper platform of the mounting structure.

In a further non-limiting embodiment of any of the foregoing battery packs, the bifurcation structure straddles a mounting structure that extends between the first battery array and the second battery array.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

DETAILED DESCRIPTION

This disclosure details exemplary traction battery pack designs for use in electrified vehicles. An exemplary traction battery pack may include a thermal barrier system adapted for mitigating thermal propagation inside of the traction battery pack during battery thermal events. The thermal barrier system may include features such as a bifurcation structure and/or a canopy structure. The bifurcation structure is adapted for substantially isolating a first portion of an enclosure interior where a first battery internal component (e.g., a first battery array) resides from a second portion of the enclosure interior where a second battery internal component (e.g., a second battery array) resides, and the canopy structure is adapted for protecting a bus bar assembly of the traction battery pack. These and other features are discussed in greater detail in the following paragraphs of this detailed description.

Figure 1:
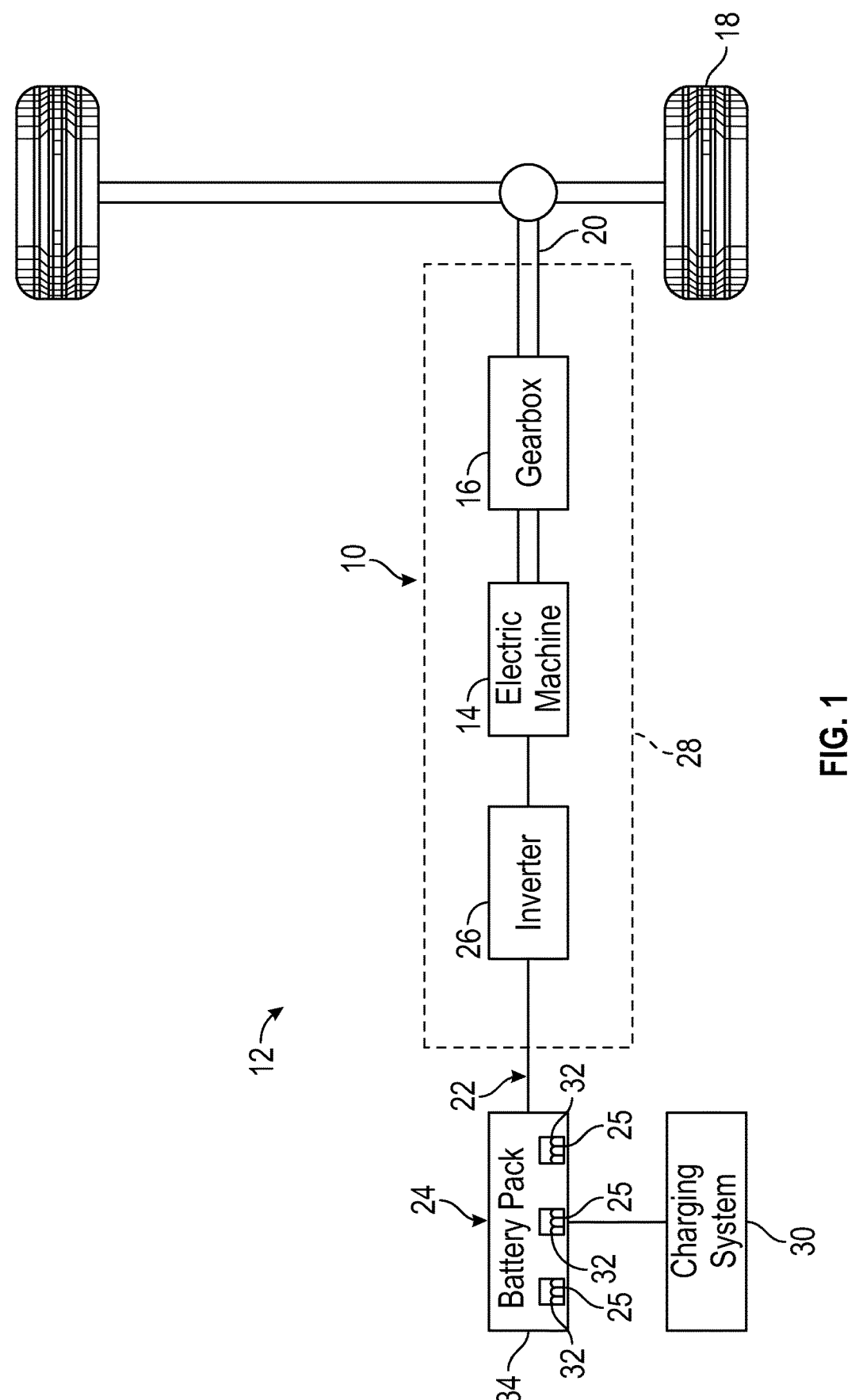
FIG. 1 schematically illustrates a powertrain of an electrified vehicle.

FIG. 1 schematically illustrates a powertrain 10 of an electrified vehicle 12. In an embodiment, the electrified vehicle 12 is a battery electric vehicle (BEV). However, it should be understood that the concepts described herein are not limited to BEVs and could extend to other electrified vehicles, including, but not limited to, hybrid electric vehicles (HEVs), plug-in hybrid electric vehicles (PHEVs), fuel cell vehicles, etc. Although not shown in this exemplary embodiment, the electrified vehicle 12 could be equipped with an internal combustion engine that can be employed either alone or in combination with other energy sources to propel the electrified vehicle 12.

In the illustrated embodiment, the electrified vehicle 12 is a full electric vehicle propelled solely through electric power, such as by an electric machine 14, without any assistance from an internal combustion engine. The electric machine 14 may operate as an electric motor, an electric generator, or both. The electric machine 14 receives electrical power and provides a rotational output torque. The electric machine 14 may be connected to a gearbox 16 for adjusting the output torque and speed of the electric machine 14 by a predetermined gear ratio. The gearbox 16 is connected to a set of drive wheels 18 by an output shaft 20.

A voltage bus 22 electrically connects the electric machine 14 to a traction battery pack 24 through an inverter 26, which can also be referred to as an inverter system controller (ISC). The electric machine 14, the gearbox 16, and the inverter 26 may be collectively referred to as a transmission 28 of the electrified vehicle 12.

The traction battery pack 24 is an exemplary electrified vehicle battery. The traction battery pack 24 may be a high voltage traction battery pack that includes one or more battery arrays 25 (i.e., battery assemblies or groupings of battery cells) capable of outputting electrical power to operate the electric machine 14 and/or other electrical loads of the electrified vehicle 12. Other types of energy storage devices and/or output devices can also be used to electrically power the electrified vehicle 12.

The one or more battery arrays 25 of the traction battery pack 24 may include a plurality of battery cells 32 that store energy for powering various electrical loads of the electrified vehicle 12. The traction battery pack 24 could employ any number of battery cells 32 within the scope of this disclosure. Accordingly, this disclosure should not be limited to the exact configuration shown in FIG. 1.

In an embodiment, the battery cells 32 are lithium-ion cells. However, other cell chemistries (nickel-metal hydride, lead-acid, etc.) could alternatively be utilized within the scope of this disclosure.

In another embodiment, the battery cells 32 are cylindrical or prismatic battery cells. However, other cell geometries could alternatively be utilized within the scope of this disclosure.

An enclosure assembly 34 may house the battery arrays 25 of the traction battery pack 24. The enclosure assembly 34 may include any size, shape, and configuration within the scope of this disclosure.

The electrified vehicle 12 may also include a charging system 30 for charging the energy storage devices (e.g., the battery cells 32) of the traction battery pack 24. The charging system 30 may include charging components that are located both onboard the electrified vehicle 12 (e.g. vehicle charge port assembly, etc.) and external to the electrified vehicle 12 (e.g., electric vehicle supply equipment (EVSE), etc.). The charging system 30 can be connected to an external power source (e.g., a grid power source) for receiving and distributing power received from the external power source throughout the electrified vehicle 12.

The powertrain 10 depicted by FIG. 1 is highly schematic and is not intended to limit this disclosure. Various additional components could alternatively or additionally be employed by the powertrain 10 within the scope of this disclosure.

During operation of the electrified vehicle 12, the battery cells 32 and other internal components of the traction battery pack 24 can experience a rare event known as thermal runaway during certain battery thermal events (e.g., overcharging, overdischarging, overheating, etc.). Further, in such conditions, the battery cells 32 may vent gases and/or other effluents into the interior of the enclosure assembly 34. The vent gases may be caused by an applied force or a thermal event, and can either cause or exacerbate an existing battery thermal event. A relatively significant amount of heat can be generated during battery thermal events, and if not contained, the generated heat can cascade to other battery internal components, thereby accelerating thermal runaway. This disclosure is therefore directed to traction battery pack designs that incorporate thermal barrier systems for mitigating thermal propagation within the interior of the traction battery pack when battery thermal events occur.

Figure 2:
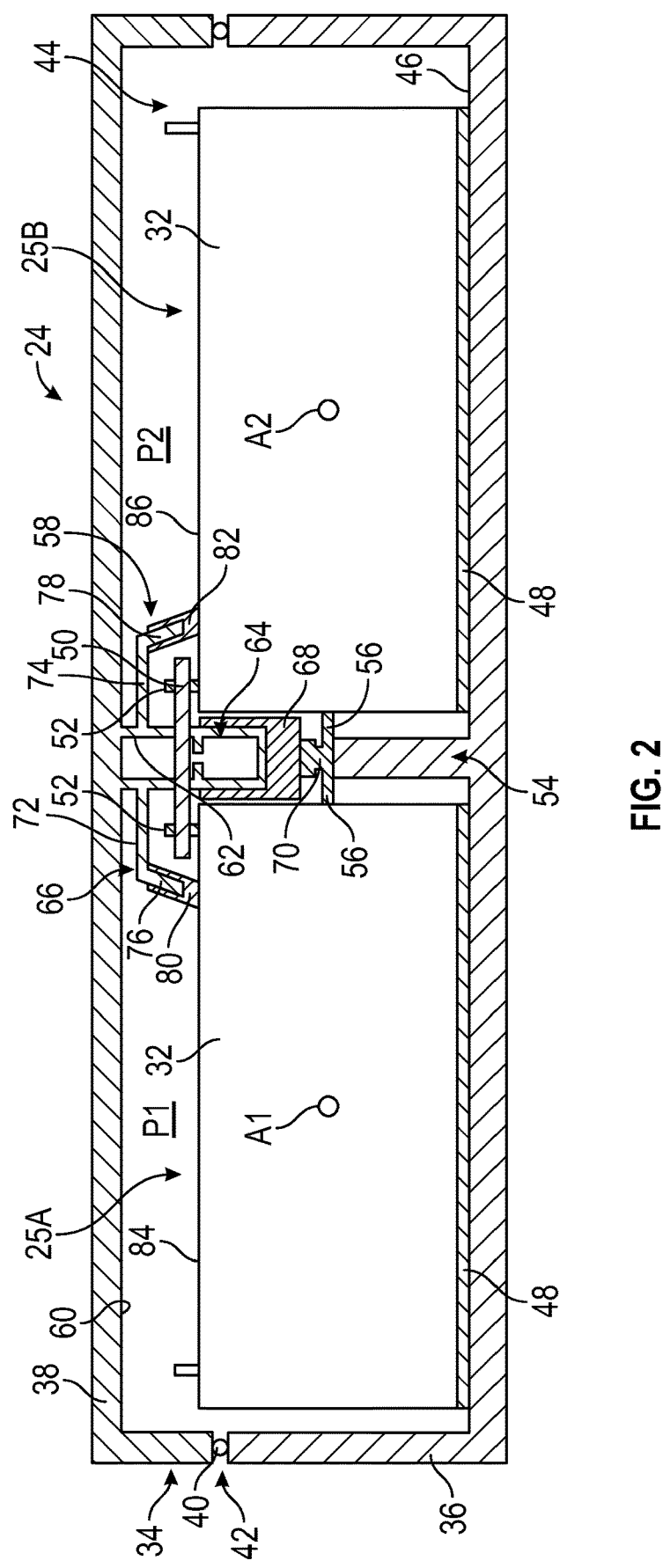
FIG. 2 is a cross-sectional view of an exemplary traction battery pack that includes a thermal barrier system.

FIG. 2 illustrates in cross-section a traction battery pack 24 that may be employed within an electrified vehicle. For example, the traction battery pack 24 could be employed as part of the powertrain 10 of the electrified vehicle 12 of FIG. 1.

The enclosure assembly 34 of the traction battery pack 24 may be a sealed enclosure that includes a tray 36, a cover 38, and a seal 40. The seal 40 may be disposed between the tray 36 and the cover 38 for sealing an interface 42 therebetween. The seal 40 may be a press-in-place seal, a foam seal, a curable seal, or any other type of seal suitable for sealing the interface 42 of the enclosure assembly 34.

The tray 36 and the cover 38 may be constructed of metallic materials, polymer-based materials, textile materials, or any combination of these materials. In an exemplary embodiment, the cover 38 is constructed of polymer-based materials and the tray 36 is constructed of metallic materials. The cover 38 may therefore include a different material makeup than the tray 36.

Once the cover 38 is secured to the tray 36, the enclosure assembly 34 may establish an interior 44 for holding battery arrays and other battery internal components (not shown in FIG. 3 for simplicity) of the traction battery pack 24. The interior 44 may be established by inner walls/surfaces of both the tray 36 and the cover 38.

In the illustrated embodiment, the traction battery pack 24 includes a first battery array 25A and a second battery array 25B housed within the interior 44. Although the traction battery pack 24 of FIG. 2 is depicted as having a two battery arrays, the traction battery pack 24 could include a greater number of battery arrays within the scope of this disclosure. Although not shown, one or more battery internal components (e.g., bussed electrical center (BEC), battery electric control module (BECM), etc.) could additionally be housed within the interior 44.

The first battery array 25A and the second battery array 25B may be positioned atop the tray 36. The cover 38 may then be received over the first and second battery arrays 25A, 25B and mounted to the tray 36 to assemble the enclosure assembly 34.

The first and second battery arrays 25A, 25B may be received relative to a floor 46 of the tray 36. The floor 46 may function as a heat exchanger plate or "cold plate" for conducting heat out of the battery cells 32 of the first and second battery arrays 25A, 25B. A thermal interface material 48 may be disposed between each of the first and second battery arrays 25A, 25B and the floor 46. The thermal interface material 48 may include an epoxy resin, a silicone based material, a thermal grease, etc. and is designed to increase the thermal conductivity between the first and second battery arrays 25A, 25B and the tray 36. Although shown as being an integrated feature of the tray 36 in this embodiment, a separate "cold plate" structure could be provided between the thermal interface material 48 and the floor 46.

A bus bar assembly 50 may be utilized to electrically couple the first battery array 25A and the second battery array 25B. The bus bar assembly 50 may be attached to terminals 52 of the first and second battery arrays 25A, 25B and is configured to carry electrical current between the first and second battery arrays 25A, 25B for electrically distributing power.

The second battery array 25B may be positioned side-by-side with the first battery array 25A within the interior 44 of the enclosure assembly 34. The first battery array 25A may extend along a first longitudinal axis A1 (into the page in FIG. 2), and the second battery array 25B may extend along a second longitudinal axis A2 (into the page in FIG. 2) that is parallel to the first longitudinal axis A1. In an embodiment, the first and second longitudinal axes A1, A2 may extend in a cross-car direction when the traction battery pack 24 is mounted on the electrified vehicle 12. However, other configurations and orientations of the first and second battery arrays 25A, 25B are further contemplated within the scope of this disclosure.

A mounting structure 54 may protrude upwardly from the tray 36 and may be disposed at a location of the interior 44 that is axially between the first and second battery arrays 25A, 25B. The mounting structure 54 could be any component of the traction battery pack 24. In an embodiment, the mounting structure 54 is an integral component of the tray 36 of the enclosure assembly 34. In another embodiment, the mounting structure 54 is a T-bracket that is fixedly mounted to the tray 36 for at least partially separating the first battery array 25A from the second battery array 25B.

Each of the first and second battery arrays 25A, 25B may include a mounting flange 56 that may be fixedly mounted (e.g., bolted, welded, etc.) to the mounting structure 54. The mounting flange 56 of the first battery array 25A may be mounted at an opposite side of the mounting structure 54 from the mounting flange 56 of the second battery array 25B.

The traction battery pack 24 may additionally include a thermal barrier system 58 configured for mitigating thermal propagation between the first and second battery arrays 25A, 25B during battery thermal events. For example, the thermal barrier system 58 may be configured to block heat, battery cell vent gases, effluents, etc. from being transferred from one of the first battery array 25A or the second battery array 25B to the other of the first battery array 25A or the second battery array 25B during battery thermal events.

In an embodiment, all or portions of the thermal barrier system 58 may be integrated features of the cover 38 of the enclosure assembly 34. For example, select portions of the thermal barrier system 58 may be molded-in or adhered to an inner surface 60 of the cover 38. The thermal barrier system 58 may protrude inwardly from the inner surface 60 in a direction toward the floor 46 of the tray 36 (e.g., toward the first and second battery arrays 25A, 25B).

The thermal barrier system 58 may include a base 62, a bifurcation structure 64, and a canopy structure 66. Although discussed herein individually due to their unique functions, each of the base 62, the bifurcation structure 64, and the canopy structure 66 may be integrally formed as unitary, molded construct.

The base 62 may protrude inwardly from the inner surface 60 of the cover 38. The base 62 may be a molded feature of the cover 62 or could be a separate component that is adhered to the inner surface 60 of the cover 38.

The bifurcation structure 64 may protrude further inwardly from the base 62 and may extend to a position that is axially between the first battery array 25A and the second battery array 25B. The bifurcation structure 64 may include an outer foam layer 68 that is received in abutting contact with an upper platform 70 of the mounting structure 54. Therefore, in combination with the mounting structure 54, the bifurcation structure 64 may substantially isolate a first portion P1 of the interior 44 where the first battery array 25A resides from a second portion P2 of the interior 44 where the second battery array 25B resides (and vice versa), thereby minimizing thermal propagation during battery thermal events.

The canopy structure 66 may be a hood-like structure that is arranged to cover at least a portion of the bus bar assembly 50. The canopy structure 66 may include a first arm 72 that protrudes outwardly in a first direction away from the base 62 for interfacing with the first battery array 25A, and a second arm 74 that protrudes outwardly in a second, opposite direction away from the base 62 for interfacing with the second battery array 25B. A first angled tip portion 76 of the first arm 72 may include an outer foam layer 80 that is received in abutting contact with an upper surface 84 of the first battery array 25A at a location that is slightly outboard of the bus bar assembly 50, and a second angled tip portion 78 of the second arm 74 may include an outer foam layer 82 that is received in abutting contact with an upper surface 86 of the second battery array 25B at a location that is slightly outboard of the bus bar assembly 50. The canopy structure 66 may thus substantially block the transfer of heat and/or cell vent byproducts, gases, effluents, etc. from the first battery array 25A and/or the second battery array 25 to the bus bar assembly 50, thereby preventing the likelihood of electrically shorting either of the battery arrays 25A, 25B through the bus bar assembly 50.

The cover 38 and the components of the thermal barrier system 58 may be made of a high temperature material. In an embodiment, the cover 38 and the base 62, the bifurcation structure 64, and the canopy structure 66 of the thermal barrier system 58 are made of a glass fiber reinforced thermoplastic material that is impregnated with a intumescent material. In another embodiment, the outer foam layers 68, 80, and 82 of the thermal barrier system 58 are made of a silicate-based or polyurethane-based material that includes a high temperature aerogel foam (e.g., silica or metal oxide). The outer foam layers 68, 80, 82 may be overmolded features of the bifurcation structure 64 and the canopy structure 66, respectively. Alternatively, the outer foam layers 68, 80, 82 may be adhered to the bifurcation structure 64 and the canopy structure 66, respectively.

Figure 3:
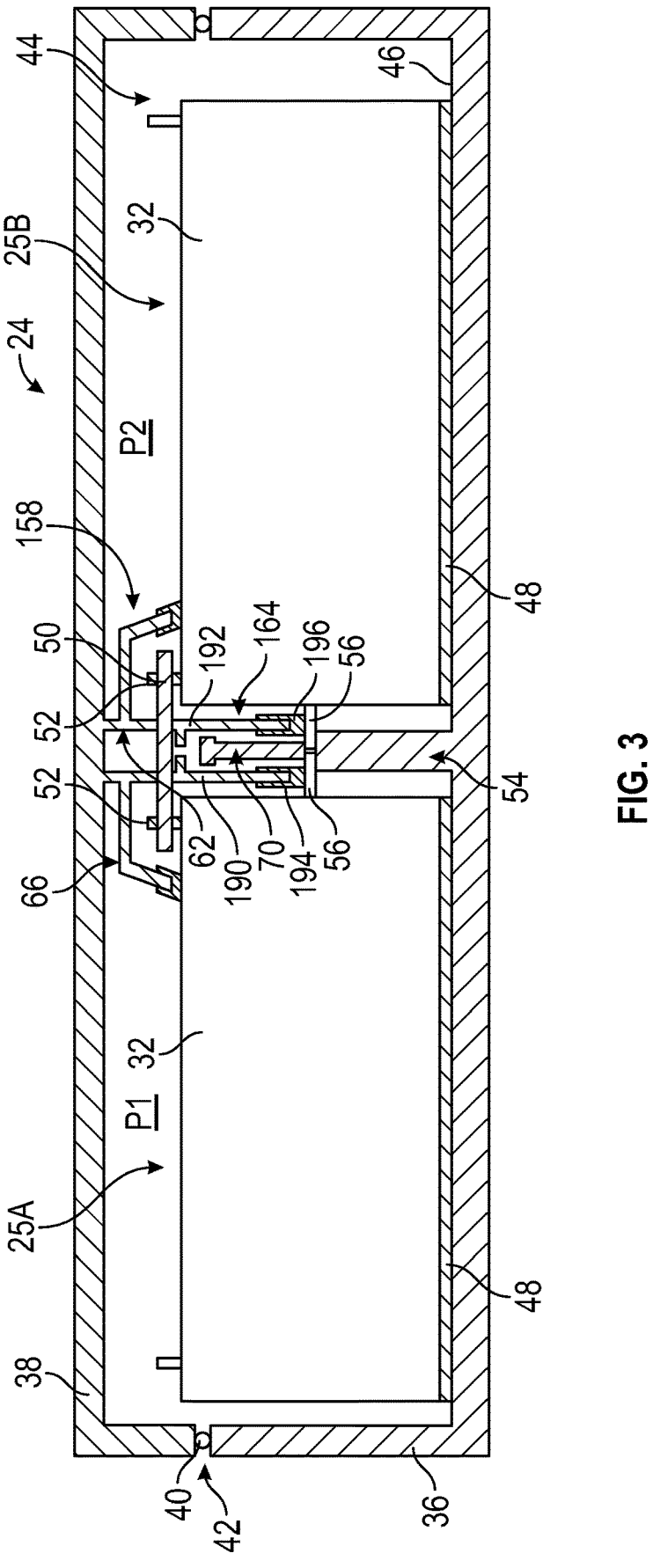
FIG. 3 is a cross-sectional view of another exemplary traction battery pack that includes a thermal barrier system.

FIG. 3 illustrates in cross-section another exemplary thermal barrier system 158 that can be utilized within the traction battery pack 24. The thermal barrier system 158 is similar to the thermal barrier system 158 discussed above. However, in this embodiment, the thermal barrier system 158 includes a slightly modified bifurcation structure 164. The base 62 and the canopy structure 66 of the thermal barrier system 158 are substantially similar to those same components of the thermal barrier system 58 of FIG. 2 and are therefore not re-discussed here for the sake of brevity.

The bifurcation structure 164 of the thermal barrier system 158 may straddle an upper platform 70 of the mounting structure 54. The bifurcation structure 164 may include a first leg 190 that extends along a first side of the upper platform 70 (e.g., between the first battery array 25A and the upper platform 70), and a second leg 192 that extends along a second side of the upper platform 70 (e.g., between the second battery array 25B and the upper platform 70).

The first leg 190 may include an outer foam layer 194 that is received in abutting contact with a mounting flange 56 of the first battery array 25A, and the second leg 192 may include an outer foam layer 196 that is received in abutting contact with a mounting flange 56 of the second battery array 25B. Therefore, in combination with the mounting structure 54, the bifurcation structure 164 may substantially isolate the first portion P1 of the interior 44 where the first battery array 25A resides from the second portion P2 of the interior 44 where the second battery array 25B resides (and vice versa), thereby minimizing thermal propagation during battery thermal events.

The exemplary thermal barrier systems of this disclosure are designed to mitigate array-to-array thermal propagation during battery thermal events for protecting the high voltage components of the traction battery pack. The thermal barrier systems may further provide increased thermal insulation between adjacent battery arrays and therefore reduce the susceptibility of adjacent modules reaching high temperatures during battery thermal events.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A battery pack, comprising:
an enclosure assembly;
a first battery array housed within the enclosure assembly;
a second battery array housed within the enclosure assembly;
a bus bar assembly configured to electrically couple the first and second battery arrays,
wherein the enclosure assembly includes a thermal barrier system adapted to minimize thermal propagation within an interior of the enclosure assembly during a battery thermal event,
wherein the thermal barrier system includes a canopy structure arranged to cover a first portion of the bus bar assembly that is attached to a first terminal of the first battery array and a second portion of the bus bar assembly that is attached to a second terminal of the second battery array.

2. The battery pack as recited in claim 1, wherein the enclosure assembly includes a tray and a cover, and further wherein the thermal barrier system protrudes from an inner surface of the cover.

3. The battery pack as recited in claim 1, wherein the canopy structure includes a first arm that is arranged to cover the first portion of the bus bar assembly and a second arm that is arranged to cover the second portion of the bus bar assembly.

4. The battery pack as recited in claim 3, wherein the first arm includes a first angled tip portion that is angled toward the first battery array and a second angled tip portion that is angled toward the second battery array.

5. The battery pack as recited in claim 4, wherein the first angled tip portion includes a first outer foam layer that is received in abutting contact with an upper surface of the first battery array, and the second angled tip portion includes a second outer foam layer that is received in abutting contact with an upper surface of the second battery array.

6. The battery pack as recited in claim 1, wherein the thermal barrier system includes a bifurcation structure that extends between the first battery array and the second battery array.

7. The battery pack as recited in claim 6, wherein the bifurcation structure isolates a first portion of the interior where the first battery array resides from a second portion of the interior where the second battery array resides.

8. The battery pack as recited in claim 6, wherein the bifurcation structure includes an outer foam layer that is received in abutting contact with an upper platform of a mounting structure that extends between the first battery array and the second battery array.

9. The battery pack as recited in claim 6, wherein the bifurcation structure straddles a mounting structure that extends between the first battery array and the second battery array.

10. A battery pack, comprising:

an enclosure assembly including a tray and a cover securable to the tray to establishing an interior;

a first battery array housed within the interior of the enclosure assembly;

a second battery array housed within the interior of the enclosure assembly;

a bus bar assembly configured to electrically couple the first and second battery arrays, a mounting structure protruding from the tray and disposed axially between the first battery array and the second battery array; and a thermal barrier system adapted to minimize thermal propagation within the interior of the enclosure assembly during a battery thermal event, wherein the thermal barrier system includes a base that protrudes inwardly from an inner surface of the cover, a bifurcation structure that extends from the base to a position between the first battery array and the second battery array and is either received in abutting contact with or straddles an upper platform of the mounting structure, and a canopy structure including a first arm that extends in a first direction away from the base and is arranged to cover a first portion of the bus bar assembly that is attached to a first terminal of the first battery array and a second arm that extends in a second direction away from the base and is arranged to cover a second portion of the bus bar assembly that is attached to a second terminal of the second battery array.

11. The battery pack as recited in claim 10, wherein each of the cover, the base, the bifurcation structure, and the canopy structure is comprised of a glass fiber reinforce thermoplastic material that is impregnated with an intumescent material.

* * * * *